(12) United States Patent
Fay et al.

(10) Patent No.: US 7,282,252 B2
(45) Date of Patent: *Oct. 16, 2007

(54) FACED INSULATION ASSEMBLY AND METHOD

(75) Inventors: Ralph Michael Fay, Lakewood, CO (US); Blake Boyd Bogrett, Littleton, CO (US)

(73) Assignee: Johns Manville, Denver, CO (US)

( * ) Notice: Subject to any disclaimer, the term of this patent is extended or adjusted under 35 U.S.C. 154(b) by 446 days.

This patent is subject to a terminal disclaimer.

(21) Appl. No.: 10/394,133

(22) Filed: Mar. 20, 2003

(65) Prior Publication Data

US 2004/0185226 A1    Sep. 23, 2004

(51) Int. Cl.
  B32B 3/02   (2006.01)
  B32B 1/04   (2006.01)
  B32B 3/10   (2006.01)
  E04B 1/74   (2006.01)
  E04C 2/34   (2006.01)

(52) U.S. Cl. .................. 428/137; 428/68; 428/74; 52/404.1; 52/481.1; 52/483.1

(58) Field of Classification Search .......... 428/31, 428/71, 117, 137, 43, 74, 55–57, 126; 52/246, 52/302.1, 404.1, 406.2, 407.3, 741.13, 407.1, 52/407.4, 420, 98; 156/257, 71
See application file for complete search history.

(56) References Cited

U.S. PATENT DOCUMENTS

| | | | |
|---|---|---|---|
| 2,913,104 A | 11/1959 | Parker | |
| 3,307,306 A | 3/1967 | Oliver | |
| 3,729,879 A | 5/1973 | Franklin | |
| 3,998,944 A | 12/1976 | Long | |
| 4,709,523 A | 12/1987 | Broderick et al. | |
| 4,952,441 A | 8/1990 | Bose | |
| 5,192,598 A * | 3/1993 | Forte et al. | 428/71 |
| 5,236,754 A | 8/1993 | McBride et al. | |
| 5,277,955 A | 1/1994 | Schelhorn et al. | |

(Continued)

FOREIGN PATENT DOCUMENTS

EP    0 940 249 A2    8/1999

(Continued)

OTHER PUBLICATIONS

"KIMMCO Glass Duct", www.alghanim.com/contentdisp.asp?pageId=486, pp. 1-5, 2002.*

(Continued)

Primary Examiner—Patricia L Nordmeyer
(74) Attorney, Agent, or Firm—Robert D. Touslee

(57) ABSTRACT

The facing of a faced building insulation assembly includes a central field portion with a selected water vapor permeance rating that is bonded to an insulation layer to provide the faced building insulation assembly with a selected water vapor permeance rating. The facing may have lateral tabs and may be separable longitudinally along separable locations in the insulation layer of the assembly. The field portion of the facing may include a fungi growth inhibiting agent, a pesticide, a coating to stiffen the facing and/or decrease the flame spread and smoke formation characteristics of the facing, and/or a heat activated bonding agent that bonds the facing to the insulation layer of the assembly.

5 Claims, 3 Drawing Sheets

U.S. PATENT DOCUMENTS

| | | | |
|---|---|---|---|
| 5,362,539 | A | 11/1994 | Hall et al. |
| 5,506,020 | A | 4/1996 | Haberkorn |
| 5,733,624 | A * | 3/1998 | Syme et al. .................. 428/68 |
| 5,746,854 | A | 5/1998 | Romes et al. |
| 5,773,375 | A | 6/1998 | Swan et al. |
| 5,848,509 | A * | 12/1998 | Knapp et al. .............. 52/406.2 |
| 6,191,057 | B1 | 2/2001 | Patel et al. |
| 6,357,504 | B1 | 3/2002 | Patel et al. |
| 6,358,599 | B1 | 3/2002 | Deibel et al. |
| 6,550,212 | B2 * | 4/2003 | Lubker, II ............... 52/741.13 |
| 2004/0088939 | A1 * | 5/2004 | Fay et al. .................. 52/407.3 |

FOREIGN PATENT DOCUMENTS

| | | | |
|---|---|---|---|
| JP | 354155265 A | 12/1979 | |
| WO | WO 02/22976 A1 | 3/2002 | |

OTHER PUBLICATIONS

"KIMMCO Alu Duct", www.alghanim.com/contentdisp.asp-?pageId=524, pp. 1-8, 2002.*

"KIMMCO Technical Information", www.alghanim.com/contentdisp.asp?pageId=490, pp. 1-9, 2002.*

"KIMMCO FAQ", www.alghanim.com/contentdisp.asp-?pageId=780, pp. 1-5, 2002.*

"EERE Consumer's Guide:Moisture Control in Walls", www.eere.energy.gov/consumber/your_home/insulation_airsealing/index.cfm.mytopic=11800.*

* cited by examiner

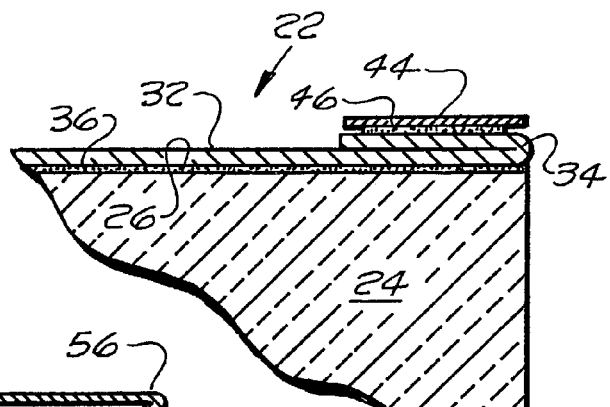
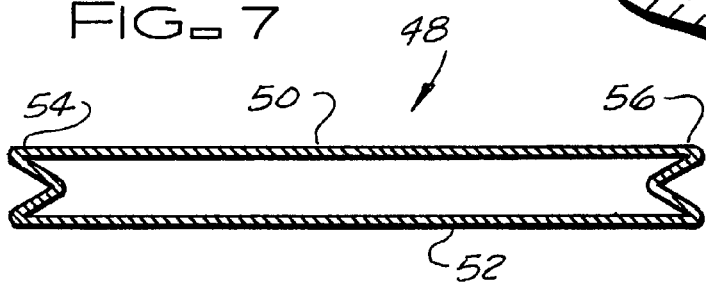
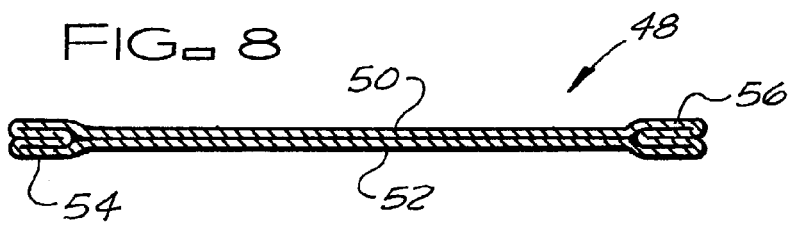
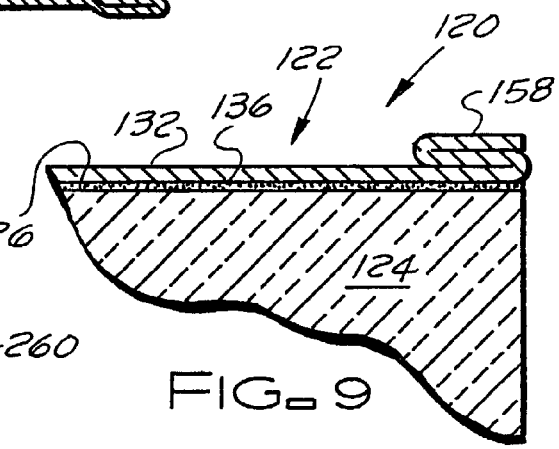
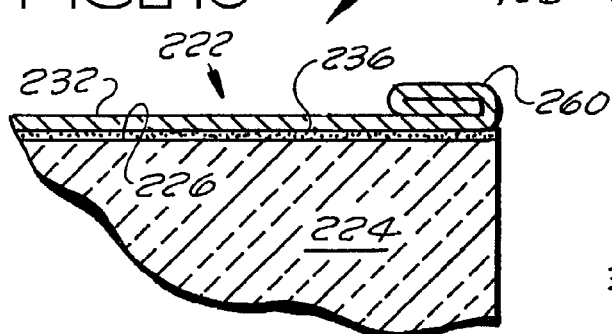
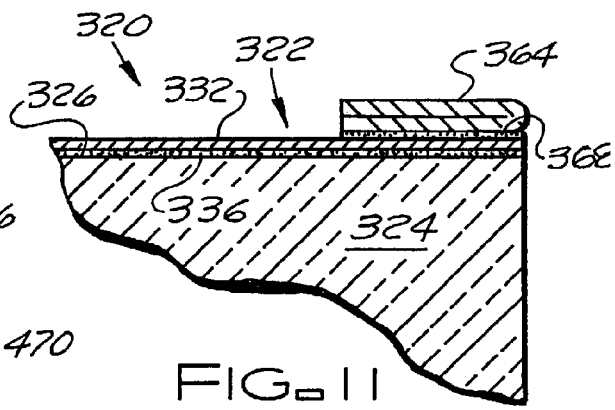
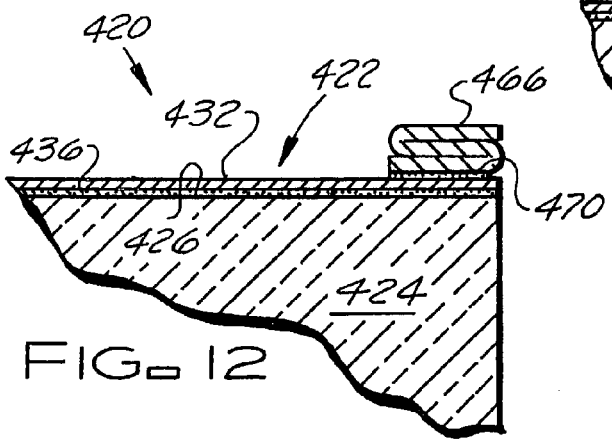

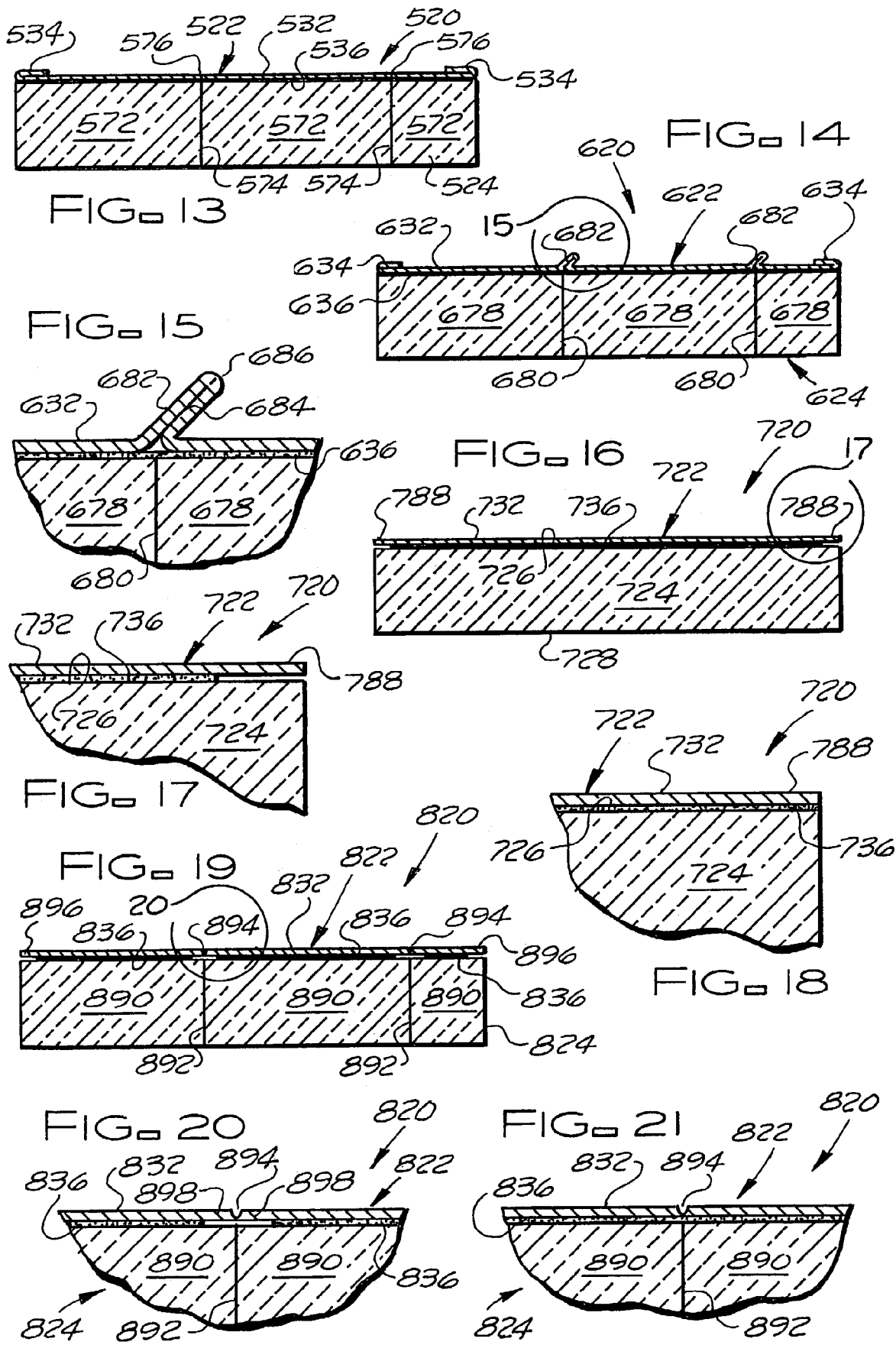

FACED INSULATION ASSEMBLY AND METHOD

BACKGROUND OF THE INVENTION

The subject invention relates to facings for faced building insulation assemblies, such as but not limited to those commonly used to insulate homes and other residential building structures; offices, stores and other commercial building structures; and industrial building structures, and to the faced building insulation assemblies faced with such facings. The facings as applied to the insulation layers of faced insulation assemblies of the subject invention are designed to improve the water vapor permeance characteristics of the faced building insulation assemblies for different applications and may also improve the fungi growth resistance, the aesthetics, the functionality of the building insulation assemblies in other respects, and installer productivity.

Building insulation assemblies currently used to insulate buildings, especially fiberglass building insulations, are commonly faced with kraft paper facings, such as 30-40 lbs/3MSF (30 to 40 pounds/3000 square feet) natural kraft paper. In addition, U.S. Pat. Nos. 5,733,624; 5,746,854; 6,191,057; and 6,357,504 disclose examples of polymeric facings for use in faced building insulation assemblies and US patent application Ser. Nos. US 2002/0179265 A1; US 2002/0182964 A1; and US 2002/0182965 A1 disclose examples of polymeric-kraft laminates for use in faced building insulation assemblies.

While building insulation assemblies faced with such kraft paper facings function quite well, have been used for decades, and the patents listed above disclose alternative facing materials, there has remained a need for facings and faced building insulation assemblies with improved performance characteristics. The improved facings of the subject invention and the building insulation assemblies faced with the improved facings of the subject invention provide faced insulation assemblies designed to exhibit improved water vapor permeance characteristics for different applications such as but not limited to hot humid conditions. The facings of the subject invention and the building insulation assemblies faced with the facings of the subject invention may also exhibit improved fungi growth resistance, improved pest control characteristics, improved aesthetics, and other improved performance characteristics (e.g. reduced flame spread and reduced smoke development) as well as enable improved installer productivity and/or other cost savings.

SUMMARY OF THE INVENTION

The facing of a faced building insulation assembly of the subject invention includes a central field portion having one or more polymeric film layers, spunbond polymeric filament mat layers; polymeric fiber mat layers, fiberglass mat layers, paper layers, paper and foil and/or scrim layers, or combinations thereof. The facings of the subject invention as applied to the insulation layers of the faced insulation assemblies of the subject invention provide the faced insulation assemblies of the subject invention with improved water vapor permeance characteristics that can be specifically designed to optimize the performance of these faced building insulation assemblies for different applications. The facings of the subject invention may be selected for their water vapor permeance ratings or may be modified to provide the facings with selected water vapor permeance ratings (e.g. the facings may be perforated or otherwise modified to provide the facings with selected water vapor permeance ratings) and the facings of the subject invention, together with the manner in which the facings are bonded to the major surfaces of the insulation layers of the faced building insulation assemblies of the subject invention provide the faced building insulation assemblies of the subject invention with water vapor permeance ratings that are specifically designed to provide superior performance for different applications. The water vapor permeance characteristics of faced building insulation assemblies of the subject invention can be customized to enhance their performance characteristics for normally relatively dry and cool conditions, normally relatively hot and humid conditions, and for conditions normally intermediate these extreme conditions. For example, when utilizing the faced insulation assemblies of the subject invention for applications subjected to hot and humid conditions such as those encountered in the insulation of buildings in hot and humid climate zones like those present in the southern United States, in the insulation of bathrooms, and in other applications where hot and humid conditions are normally encountered, the water vapor permeance ratings of the faced building insulation assemblies of the subject invention to be installed under such conditions can be made higher than the water vapor permeance ratings of faced building insulation assemblies of the subject invention to be utilized under conditions of normally lower relative humidity and temperatures.

Preferably, the facings of the subject invention are fungi growth resistant facings as defined herein that, more preferably exhibit no more than traces of sporulating growth, non-sporulating growth, or both sporulating and non-sporulating growth as defined herein, and most preferably, exhibit no sporulating growth or non-sporulating growth as defined herein. When a surface of a specimen of a facing sheet material of the subject invention or of a facing of the subject invention, as bonded to an insulation layer of an insulation assembly of the subject invention, and a surface of a comparative specimen of a white birch or southern yellow pine wood, which are each approximately 0.75 by 6 inches (20 by 150 mm), are tested as follows, preferably, the specimen of facing sheet material or facing of the subject invention will have less spore growth than the comparative specimen of white birch or southern yellow pine. Spore suspensions of *aspergillus niger, aspergillus versicolor, penicillium funiculosum, chaetomium globosum*, and *asperguillus flavus* are prepared that each contain 1,000,000±200,000 spores per mL as determined with a counting chamber. Equal volumes of each of the spore suspensions are blended together to produce a mixed spore suspension. The 0.75 by 6 inch surface of the specimen of the facing sheet material or facing of the subject invention and the 0.75 by 6 inch surface of the comparative specimen of white birch or southern yellow pine wood are each inoculated with approximately 0.50 mL of the mixed spore suspension by spraying the surfaces with a fine mist from a chromatography atomizer capable of providing 100,000±20,000 spores/inch$^2$. The specimens are immediately placed in an environmental chamber and maintained at a temperature of 86±4° F. (30±2° C.) and 95±4% relative humidity for a minimum period of 28 days±8 hours from the time incubation commenced (the incubation period). At the end of the incubation period, the specimens are examined at 40× magnification. The tested specimen of the facing sheet material or facing passes the test provided the specimen of the facing sheet material or facing has less observable spore growth at a 40× magnification than the comparative specimen of white birch or southern yellow pine wood. As used in this specification and claims the term "fungi growth resistant" means the observable spore growth at a 40× magnification on the surface of the tested facing sheet material or facing specimen is less than the observable spore growth at a 40× magnification on either a comparative white birch or southern yellow pine specimen when the specimens are tested as set forth in this paragraph.

When a surface of a 50-mm by 50-mm specimen or 50-mm diameter specimen of a facing sheet material of the subject invention or facing of the subject invention, as bonded to an insulation layer of a faced insulation assembly of the subject invention, has been tested as follows, the specimen will preferably, exhibit only microscopically observable traces of sporulating growth, non-sporulating growth or both sporulating and non-sporulating growth and, more preferably, exhibit no microscopically observable sporulating growth or non-sporulating growth. Separate spore suspensions of *aspergillus niger, penicillium pinophilum, chaetomium globosum, gliocladium virens*, and *aureobasidium pullulans* are prepared with a sterile nutrient-salts solution. The spore suspensions each contain 1,000,000±200,000 spores per mL as determined with a counting chamber. Equal volumes of each of the spore suspensions are blended together to produce a mixed spore suspension. A solidified nutrient-salts agar layer from 3 to 6 mm (⅛ to ¼ inch) is provided in a sterile dish and the specimen is placed on the surface of the agar. The entire exposed surface of the specimen is inoculated and moistened with the mixed spore suspension by spraying the suspension from a sterilized atomizer with 110 kPa (16 psi) of air pressure. The specimen is covered and incubated at 28 to 30° C. (82 to 86° F.) in an atmosphere of not less than 85% relative humidity for 28 days. The surface of the specimen is then microscopically observed to visually examine for sporulating and/or non-sporulating growth. The magnification used for making the microscopic observations to determine both sporulating growth and non-sporulating growth is selected to enable non-sporulating growth to be observed. As used in this specification and claims the term "traces of sporulating growth, non-sporulating growth, or both sporulating and non-sporulating growth" means a microscopically observable sporulating growth, non-sporulating growth, or both sporulating and non-sporulating growth of the mixed spore suspension on the surface of the specimen being tested when the specimen is tested under the conditions set forth in this paragraph that, at the conclusion of 28 days, cover(s) less than 10% of the surface area of the surface of the specimen being tested. As used in this specification and claims the term "no sporulating growth or non-sporulating growth" means no observable sporulating growth or non-sporulating growth of the mixed spore suspension on the surface of the specimen being tested at the conclusion of 28 days when the specimen is tested under the conditions set forth in this paragraph.

To achieve the desired fungi growth resistance, the facings of the subject invention may include a fungi-growth inhibiting agent. The facings of the subject invention may also include a pesticide and/or may include a heat activated bonding layer that bonds the facing to the insulation layer of the assembly. As used herein the term "bonding layer" includes both a bonding layer that does not require heat activation such as but not limited to a coating, spray on, a spray on fiberized adhesive, or other continuous or discontinuous adhesive layer, and a heat activated bonding layer such as but not limited to asphalt, a polymeric film, a polymeric coating, a polymeric fiber mat, a polymeric fiber mesh, a spray on adhesive, a spray on particulate or fiberized adhesive, or other continuous or discontinuous heat activated bonding layers having a softening point temperature sufficiently low to enable the heat activated bonding layer to be heated to a temperature to effect a bond between the facing and a major surface of the insulation layer without degrading the facing. The bonding layer may be pre-applied to the facing or applied to the facing and/or major surface of the insulation layer at the point where the facing and the insulation layer are being combined.

The facing may have a central field portion that is sufficiently transparent to enable the insulation layer of an insulation assembly to be seen through the facing. The facing may have lateral tabs sufficiently transparent to enable framing members to be seen through the tabs, sufficiently open to enable wallboard to be directly bonded to framing members overlaid by the tabs, and/or sufficiently greater in integrity than the field portion of the facing to permit a less expensive material to be used for the field portion of the facing. The field portion of the facing may include a mineral coating e.g. clay coating or polymeric coating including modifiers to stiffen the facing, inhibit fungi growth, treat or control pests, and/or decrease the flame spread and smoke formation characteristics of the facing.

The facings of the subject invention may be formed from gusseted tubular sheet materials. The facings of the subject invention may be separable longitudinally at spaced apart locations in the central field portions of the facings so that the facings can be applied to pre-cut longitudinally separable insulation layers and separated where the pre-cut longitudinally separable insulation layers are separable. The building insulation assemblies of the subject invention may have laterally compressible resilient insulation layers faced with facing having portions, e.g. lateral edge portions, which are or which may be separated from the insulation layers when the insulation layers are laterally compressed to form tabs. The building insulation assemblies of this paragraph may utilize any of the facing materials of the subject invention.

BRIEF DESCRIPTION OF THE DRAWINGS

FIG. 6 is partial schematic view of another embodiment of the faced insulation assembly of the subject invention showing a tab strip bonded to one of the tabs of the facing of FIGS. 1 to 3.

FIG. 7 is a schematic transverse cross section though a tubular sheet material with lateral gussets that can be made into a facing of the subject invention.

FIG. 8 is a schematic transverse cross section through the tubular sheet material of FIG. 7 after the tubular sheet material has been collapsed and bonded together.

FIGS. 9 to 12 are partial schematic views of embodiments of the faced insulation assembly of the subject invention showing other tabs that may be substituted for the tabs shown on the facing of FIGS. 1 to 3. The partial schematic views of FIGS. 9 to 12 correspond to the view of FIG. 3 for the embodiment of FIGS. 1 to 3.

FIG. 13 is a schematic end view of a faced pre-cut insulation assembly with a facing of the subject invention that is longitudinally separable at each location where the insulation layer is longitudinally separable.

FIG. 14 is a schematic end view of a faced pre-cut insulation assembly with a facing of the subject invention that is longitudinally separable at each location where the insulation layer is longitudinally separable and provided with tabs at each location where the insulation layer is separable.

FIG. 15 is schematic view of the circled portion of FIG. 14 on a larger scale than FIG. 14.

FIG. 16 is a schematic end view of a faced insulation assembly of the subject invention where the facing is without preformed tabs.

FIG. 17 is a schematic view of the circled portion of FIG. 16 on a larger scale than FIG. 16.

FIG. 18 is a schematic view of a modified version of the circled portion of FIG. 16 on a larger scale than FIG. 16.

FIG. 19 is a schematic end view of a faced pre-cut insulation assembly with a facing of the subject invention that has no preformed tabs and is longitudinally separable at each location where the insulation layer is longitudinally separable.

FIG. 20 is a schematic view of the circled portion of FIG. 19 on a larger scale than FIG. 19.

FIG. 21 is a schematic view of a modified version of the circled portion of FIG. 19 on a larger scale than FIG. 19.

DESCRIPTION OF THE PREFERRED EMBODIMENTS

Figure 1:
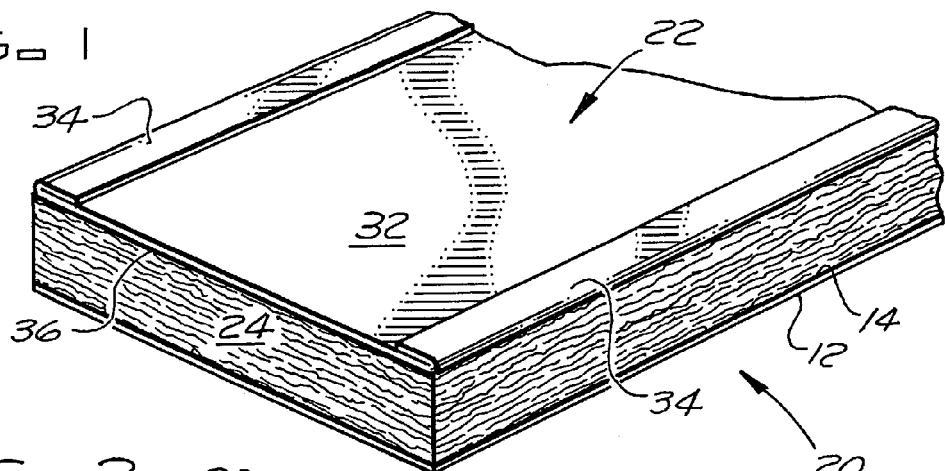
FIG. 1 is a schematic perspective view of a first embodiment of the faced insulation assembly of the subject invention.
Figure 2:
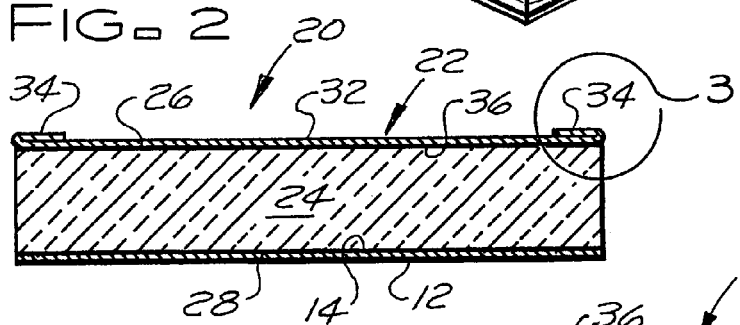
FIG. 2 is a schematic end view of the faced insulation assembly of FIG. 1.

FIGS. 1 and 2 show a typical faced insulation assembly 20 of the subject invention. The faced insulation assembly 20 includes a facing 22 of the subject invention and an insulation layer 24. The insulation layer 24 has first and second major surfaces 26 and 28, which are defined by the length and width of the insulation layer, and a thickness. The facing 22 of the faced insulation assembly 20 is formed of a sheet material that has a central field portion 32 and a pair of lateral tabs 34 that are typically between 0.25 and 1.5 inches in width. The lateral tabs 34 can be unfolded and extended beyond the lateral surfaces of the insulation layer 24 of the faced insulation assembly 20 (typically extended between 0.25 and 1.5 inches beyond the lateral surfaces of the insulation layer) for attachment to framing members forming a cavity being insulated by the faced insulation assembly and/or unfolded and extended beyond the lateral surfaces of the insulation layer 24 of the faced insulation assembly 20, e.g. to overlap the framing members forming a cavity being insulated by the faced insulation assembly. The central field portion 32 of the sheet has a first outer major surface and a second inner major surface. The central field portion 32 of the sheet overlays, is substantially coextensive with, and is bonded, typically by a bonding layer 36 on the inner major surface of central field portion 32 of the sheet, to the major surface 26 of the insulation layer 24.

Figure 3:
FIG. 3 is a schematic view of the circled portion of FIG. 2 on a larger scale than FIG. 2.

While not required for many applications, as shown, in FIGS. 1-3, the insulation assembly 22 also includes a second facing 12 that overlays, is substantially coextensive with, and is bonded, typically by a bonding layer 14 to the major surface 28 of the insulation layer 24. The facing 12 may exhibit the same physical properties as the facing 22 or may have physical properties that differ from the physical properties of the facing 22. For example, in certain applications, the facing 22 forms the major surface of the insulation assembly 20 that is located on the normally cooler and less humid side of a cavity being insulated by the insulation assembly 20 and the facing 12 forms the major surface of the insulation assembly 20 that is located on the hotter and more humid side of a cavity being insulated by the insulation assembly 20. One such application for the faced building insulation assembly 20 is in a building or climate zone where an air conditioned interior of a building insulated with the insulation assembly 20 will normally be cooler and less humid than the atmospheric conditions exterior of the building, e.g. in southern Florida. For such an application, it may be desirable to have the major surface of the faced building insulation assembly faced with the facing 22 exhibit a water vapor permeance rating of 5 or greater so that water vapor can readily pass through that major surface of the faced building insulation assembly 20 while the major surface of the faced building insulation assembly faced with the facing 12 exhibits a water vapor permeance rating of 1 or less so that the passage of water vapor through that major surface of the faced building insulation assembly 20 is retarded. With this structure, the facing 12 helps to prevent or reduce an unwanted build up of moisture within the cavity by retarding the passage of water vapor into the insulated cavity from the hot and humid exterior of the building. In addition, where moisture does enter the insulated cavity, the water vapor permeability of the facing 22 helps to prevent or reduce an unwanted build up of moisture within the cavity by permitting the water vapor to pass from the cavity though the facing 22 and into the interior of the building where it is dissipated by the air conditioning.

Figure 4:
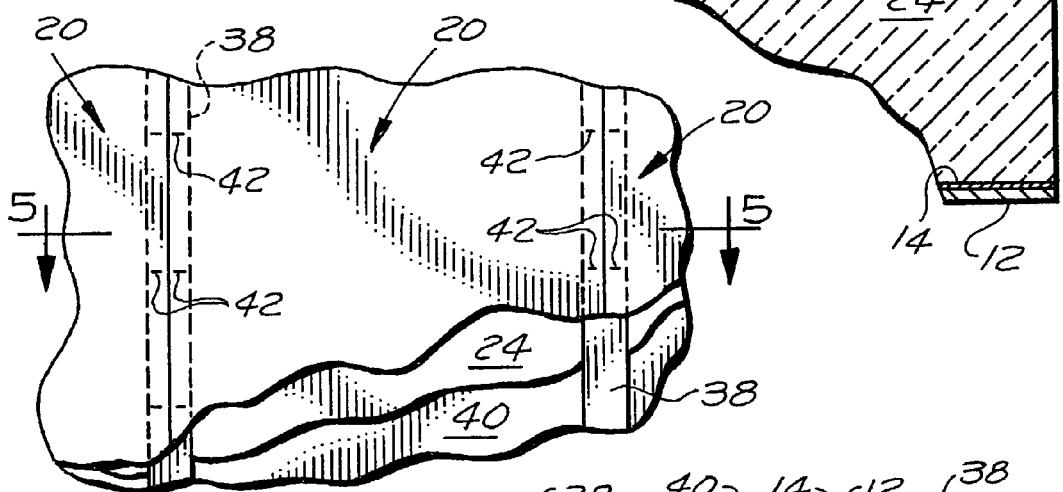
FIGS. 4 and 5 are schematic views of faced insulation assemblies of FIGS. 1 to 3 installed in a wall cavity.
Figure 5:
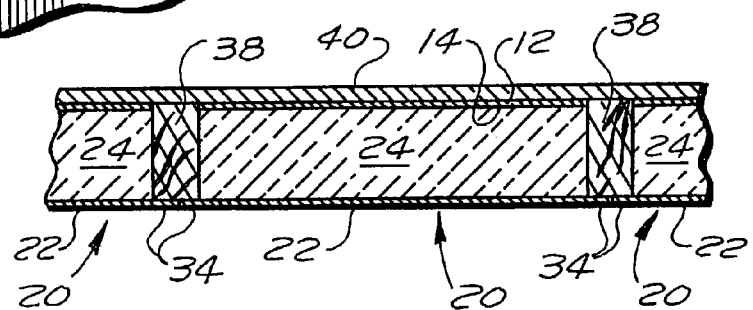

FIGS. 4 and 5 show faced insulation assemblies 20 installed in a wall cavity defined on three sides by two spaced apart framing members 38 (e.g. wooden 2×4 or 2×6 studs) and a sheet of sheathing 40. As shown in FIG. 4, the tabs 34 of the faced insulation assemblies 20 are secured to the end surfaces of the framing members 38 by staples 42. While the insulation assemblies 20 are shown installed in wall cavities, the insulation assemblies 20 may also be installed between framing members in other building cavities such as but not limited to ceiling, floor, and roof cavities. While, as shown, the tabs 34 are stapled to the end surfaces of the faming members 38, the tabs may be stapled to the side surfaces of the framing members 38, may be bonded to the end surfaces of the framing members 38 or the side surfaces of the framing members 38, may overlap end surfaces of the framing members 38 without being secured to the framing members, or, if desired, may be left in their initial folded configuration.

FIG. 6 shows a partial cross section of the facing 22 of FIGS. 1 to 3 that corresponds to FIG. 3 wherein the lateral tabs 34 include tab strips 44. The lateral tabs 34 each have a tab strip 44 that overlays, is coextensive or essentially coextensive with, and is bonded to one surface of the lateral tab 34. The tab strips 44 provide the lateral tabs 34 with increased integrity relative to central field portion 32 of the facing sheet 22 for handling and stapling and may be selected to have sufficient integrity to enable the use of thinner and/or less expensive sheet materials for the facing sheet 22. In addition, the tab strips 44 may also function as release liners overlaying layers or coatings 46 of pressure-sensitive adhesives on the lateral tabs 34 that may be used to secure the lateral tabs 34 to framing members 38.

While the insulation layers faced with the facings of the subject invention may be made of other materials, such as but not limited to foam insulation materials, preferably, the insulation layers of the insulation assemblies of the subject invention are resilient fibrous insulation blankets and, preferably, the faced conventional uncut resilient fibrous insulation blankets and the faced pre-cut resilient fibrous insulation blankets of the subject invention are made of randomly oriented, entangled, glass fibers and typically have a density between about 0.3 pounds/ft$^3$ and about 1.6 pounds/ft$^3$. Examples of fibers other than glass fibers that may be used with glass fibers or instead of glass fibers to form the faced resilient insulation blankets of the subject invention are mineral fibers, such as but not limited to, rock wool fibers, slag fibers, and basalt fibers; organic fibers such as but not limited to polypropylene, polyester and other polymeric fibers; natural fibers such as but not limited to cellulose, wood, flax and cotton fibers; and/or combinations thereof. The fibers in the faced resilient insulation blankets of the subject invention may be bonded together at their points of intersection for increased integrity, e.g. by a binder such as but not limited to polycarboxy polymers, polyacrylic acid polymers, urea phenol formaldehyde or other suitable bonding materials, or the faced resilient fibrous insulation blankets of the subject invention may be binder-less provided the blankets possess the required integrity and resilience.

While the faced resilient fibrous insulation blankets of the subject invention may be in roll form (typically in excess of 117 inches in length), for most applications, such as the insulation of walls in homes and other residential structures, the faced resilient fibrous insulation blankets of the subject invention are in the form of batts about 46 to about 59 inches in length (typically about 48 inches in length) or 88 to about 117 inches in length (typically about 93 inches in length). Typically, the widths of the faced resilient fibrous insulation blankets are substantially equal to or somewhat greater than standard cavity width of the cavities to be insulated, for example: about 15 to about 15½ inches in width (a nominal width of 15 inches) for a cavity where the center to center spacing of the wall, floor, ceiling or roof framing members is about 16 inches (the cavity having a width of about 14½ inches); and about 23 to about 23½ inches in width (a nominal width of 23 inches) for a cavity where the center to center spacing of the wall, floor, ceiling or roof framing members is about 24 inches (the cavity having a width of about 22½ inches). However, for other applications, the faced resilient fibrous insulation blankets may have different initial widths determined by the standard widths of the cavities to be insulated by the insulation blankets.

The amount of thermal resistance or sound control desired and the depth of the cavities being insulated by the faced insulation assemblies determine the thicknesses of the faced insulation assemblies of the subject invention, e.g. faced resilient fibrous insulation blankets. Typically, the faced insulation assemblies are about three to about ten or more inches in thickness and approximate the depth of the cavities being insulated. For example, in a wall cavity defined in part by nominally 2×4 or 2×6 inch studs or framing members, a faced pre-cut resilient fibrous insulation blanket will have a thickness of about 3½ inches or about 5½ inches, respectively.

A first sheet material that may be used for the facings 12 and 22 of the faced insulation assembly 20 and for the facings of the other faced insulation assemblies of the subject invention is a synthetic paper-like polymeric film, e.g. an extruded, coextruded, or blown synthetic filled polyethylene or polypropylene paper film, between 0.5 and 3 mils in thickness. The first sheet material of the subject invention may include a fungi growth-inhibiting agent and preferably, has substantially the same color as the insulation layer of the faced insulation assembly, e.g. insulation layer 24 of the faced insulation assembly 20. An example of such a film is a white paper-like polymeric film available from Vanguard Plastics, Incorporated of Dallas, Tex. This film is a 1.25 mil thick film that is coextruded in three layers with the two surface film layers each being a Papermatch® mineral filled resin film layer about 0.25 mil thick and the middle film layer being a clear HDPE resin film layer. Preferably, such a white film would be used to face an insulation layer that is white in color such as a white, formaldehyde free, fiberglass insulation. The first sheet material may also have an inner heat activated bonding layer, such as an inner polymeric film or coating layer, on the inner major surface of the first sheet material with a relatively low temperature softening point when compared to the softening point temperature of the other polymeric film layer of the sheet material (e.g. a softening point temperature that is lower by about 60° F. or more) whereby the inner polymeric film or coating layer can be used as a heat activated adhesive to bond the facing to the insulation layer. For example, the inner polymeric film or coating layer could have a softening point temperature of 190° F. or less while the other polymeric film layer has a softening point temperature of 250° F. or more A second sheet material that may be used for the facings 12 and 22 of the faced insulation assembly 20 and for the facings of the other faced insulation assemblies of the subject invention is a transparent polymeric film or a translucent polymeric film. The second sheet material may include a fungi growth-inhibiting agent and is sufficiently clear to enable both the insulation layer of the faced insulation assembly to be seen through the central field portion of the facing and the framing members to be seen through the lateral tabs of the facing. The ability to see the insulation layer of the insulation assembly through the central field portion of the facing and the framing members through the tabs of the facing will enable the installers to more easily locate the framing members for securing wallboard to the framing members after the tabs of the faced insulation assembly have overlapped or overlapped and been secured to end surfaces of the framing members. A company logo can be embossed into, printed onto, or watermarked onto this polymeric film sheet material.

This second sheet material may be a laminate including two or more layers of polymeric film that are bonded together and sufficiently clear to be seen through and enable both the insulation layer of the faced insulation assembly to be seen through the central field portion of the facing and framing members to be seen through the lateral tabs of the facing. Where the second sheet material is a laminate, a company logo can be watermarked onto the second sheet material by locating the watermark in the central field portion of the facing on one of the opposed surfaces the two outermost polymeric film layers of the laminate. Transparent or translucent polymeric films that may be used as the second sheet materials are polymeric films such as but not limited to transparent or translucent low density polyethylene films (LDPE films), transparent or translucent high density polyethylene films (HDPE), transparent or translucent polypropylene films (PP films) or combinations thereof. Where the second sheet material is a polymeric film laminate, the polymeric film layers may be cast or coextruded to form the laminate or heat welded or otherwise bonded together.

Where the second sheet material is a polymeric film laminate, the second sheet material can be strengthened by using stretched polymeric film layers that are cross-laminated. By a process known as stretching, the polymer chains in a polymeric film layer can be realigned to provide the polymeric film layer with a tear strength in a first direction that is greater than the initial tear strength of the polymeric film layer and greater than the tear strength of the polymeric film layer in a second direction perpendicular to the first direction. Two of these stretched polymeric film layers can be laminated together with the films oriented so that the direction of greater tear strength for the first polymeric film layer is perpendicular to the direction of greater tear strength for the second polymeric film layer. The additional tear strength provided the facing with such a laminate structure will provide the tabs of the facing with greater tear strength for handling and help prevent staple pull through when the tabs are secured to framing members by staples.

While a preferred form of the second sheet material is transparent or translucent, it is also contemplated the one polymeric film layer or one or more of the polymeric film layers in the laminate forming the second sheet material can be colored. A preferred color for a facing used in a faced insulation assembly with a white insulation layer, such as a white, formaldehyde free, fiberglass insulation layer, is white. The second sheet material may also have an inner heat activated bonding layer, e.g. polymeric film or coating layer, on the inner major surface of the first sheet material with a relatively low temperature softening point when compared to the softening point temperature of the other polymeric film layer(s) of the sheet material (e.g. a softening point temperature that is lower by about 60° F. or more) whereby the inner polymeric film or coating layer can be used as a heat activated adhesive to bond the facing to the insulation layer. For example, the inner polymeric film or coating layer could have a softening point temperature of 190° F. or less while the other polymeric film layer(s) have softening point temperatures of 250° F. or more. Where the second sheet material is transparent or translucent, the heat activated bonding layer would also be sufficiently transparent or translucent to enable the insulation layer can be seen through the facing and bonding layer.

A third sheet material that may be used for the facings 12 and 22 of the faced insulation assembly 20 and for the facings of the other faced insulation assemblies of the subject invention is a mineral coated (e.g. clay coated) thin polymeric film laminate with a fungi growth inhibiting agent that may be used rather than a more expensive uncoated polymeric film. The laminate of the third sheet material includes a thin and/or less expensive polymeric film layer, e.g. a polymeric film layer about 1 mil or less in thickness, and a mineral coating layer e.g. a clay coating layer. The mineral coating layer forms the outer layer and the outer major surface of the third sheet material. At a relatively low cost, the mineral coating layer increases the stiffness and body of the third sheet material, the integrity of the third sheet material, the "cuttability" of the third sheet material, the "cuffability" (ability of the third sheet material to hold a fold when forming tabs), and the fire resistance of the third sheet material. The mineral coating can also include other performance enhancing characteristics to improve the overall performance of the faced insulation assembly. For example, the mineral coating can include a fungi growth-inhibiting agent, a pesticide (e.g. an insecticide, a termiticide), a desired coloration, etc. The mineral coating may be paint. Polymeric films that may be used in the laminate of the third sheet material are polymeric films such as but not limited to low density polyethylene films (LDPE films), high density polyethylene films (HDPE), polypropylene films (PP films), films with substantially the same performance characteristics as the polyethylene and polypropylene films, and/or combinations thereof. The third sheet material may also have an inner heat activated bonding layer, e.g. a polymeric film or coating layer, on the inner major surface of the first sheet material with a relatively low temperature softening point when compared to the softening point temperature of the other polymeric film layer of the sheet material (e.g. a softening point temperature that is lower by about 60° F. or more) whereby the inner polymeric film or coating layer can be used as a heat activated adhesive to bond the facing to the insulation layer. For example, the inner polymeric film or coating layer could have a softening point temperature of 190° F. or less while the other polymeric film layer has softening point temperatures of 250° F. or more.

A fourth sheet material that may be used for the facings 12 and 22 of the faced insulation assembly 20 and for the other facings of the faced insulation assemblies of the subject invention is a mineral coated thin lightweight kraft paper laminate (e.g. a clay coated 20-30 or 30-40 lbs/3MSF kraft paper laminate) that may be used rather than a 35-38 lbs/3MSF extensible natural kraft commonly used to face fiberglass insulation assemblies. The laminate of the fourth sheet material includes a lightweight and less expensive kraft paper layer, a mineral coating layer (e.g. clay coating layer), and a fungi growth-inhibiting agent. The mineral coating layer forms the outer layer and the outer major surface of the fourth sheet material. At a relatively low cost, the mineral coating layer increases the stiffness and body of the fourth sheet material, the integrity of the fourth sheet material, the "cuttability" of the fourth sheet material, the "cuffability" (ability of the fourth sheet material to hold a fold when forming tabs), and the fire resistance of the fourth sheet material. The mineral coating can also provide the facing with other performance enhancing characteristics to improve the overall performance of the faced insulation assemblies of the subject invention. For example, the mineral coating can include a fungi growth-inhibiting agent, a pesticide (e.g. an insecticide, a termiticide), a desired coloration, etc. The mineral coating may be paint. The fourth sheet material may also have an inner heat activated bonding layer, e.g. polymeric film or coating layer, on the inner major surface of the lightweight kraft paper layer with a low temperature softening point, e.g. a softening point of less than 225° F. whereby the inner polymeric film or coating layer can be used as a heat activated adhesive to bond the facing to the insulation layer.

A fifth sheet material that may be used for the facings 12 and 22 of the faced insulation assembly 20 and for the other facings of the faced insulation assemblies of the subject invention is a laminate including a natural kraft paper or tissue paper overlaid on both major surfaces with a polymeric coating or film layer. The polymeric coating or film layers encapsulate the natural kraft paper or tissue paper and thereby make the sheet material more moisture resistant and fungi growth resistant than a typical uncoated kraft facing material. An example of a polymeric coating or film layer is a polyolefin coating or film layer, such as but not limited to a polyethylene or polypropylene coating or film layer with a fungi growth-inhibiting agent. An example of the fifth sheet material is a laminate that includes an unbleached natural kraft base layer, e.g. a 20-30 lb/3msf natural kraft that is encapsulated between outer and inner white-pigmented HDPE film layers such as HDPE film layers applied at a weight of about 7-15 lbs/3msf. This example of the fifth sheet material is a balanced sheet material that protects the encapsulated kraft layer, has excellent fold-ability (folds easily and holds the fold), is almost waterproof, and exhibits increased toughness. The polymeric coating or film layer forming the outer layer of the laminate and the outer major surface of the laminate may have a higher temperature softening point than the polymeric coating or film layer forming the inner layer of the laminate and the inner major surface of the laminate e.g. the outer polymeric layer may have a softening point of about 250° F. while the inner polymeric layer may have a softening point of less than 190° F. (a 60° F. temperature difference). The inner layer of the laminate can thus be used as a heat activated bonding layer for bonding the facing to the first major surface of the insulation layer. The outer polymeric layer can be made in various colors. A preferred color for a facing used in a faced insulation assembly with a white insulation layer, such as a white, formaldehyde free, fiberglass insulation layer, is white.

A sixth sheet material that may be used for the facings 12 and 22 of the faced insulation assembly 20 and for the other facings of the faced insulation assemblies of the subject invention is a lightweight nonwoven polymeric filament or fiber mat (e.g. a lightweight spunbond nonwoven continuous polyester, polypropylene or polyethylene filament mat or a lightweight nonwoven staple polyester, polypropylene or polyethylene fiber mat) or a lightweight nonwoven fiberglass mat. An example of a lightweight spunbond nonwoven continuous polymeric filament mat that may be used as the sixth sheet material is a lightweight spunbond nonwoven continuous polyester filament mat having a weight between 15 and 30 grams per square meter, such as a spunbond nonwoven polyester mat sold by Johns Manville International, Inc., under the designation type 488/15, type 488/20, or type 488/30. An example of a lightweight nonwoven fiberglass mat that may be used as the sixth sheet material is a lightweight nonwoven fiberglass mat having a weight between 20 and 80 grams per square meter, such as a nonwoven fiberglass mat sold by Johns Manville International, Inc., under the trade designation Dura-Glass® style 3011 mat. These mats typically have a water vapor permeance rating greater than 5 perms. A polymeric filament web or open mesh or a fiberized polymeric material having a lower softening point than the mat may be adhered to an inner major surface of either of these mats and used as a heat activated bonding layer to bond either of these mats to the first major surface of the insulation layer. For example a polypropylene web or open mesh having a softening point of about 250° F. or less can be adhered to the inner major surface of a spunbond nonwoven polyester mat having a softening point of about 350° F. or greater.

A seventh sheet material that may be used for the facings 12 and 22 of the faced insulation assembly 20 and for the facings of the other faced insulation assemblies of the subject invention is a laminate that includes a lightweight nonwoven polymeric filament or fiber mat (e.g. a lightweight spunbond nonwoven continuous polymeric filament mat or a lightweight nonwoven staple polymeric fiber mat) or a lightweight nonwoven fiberglass mat overlaid with a polymeric film or polymeric coating layer. An example of a lightweight spunbond nonwoven continuous polymeric filament mat that may be used as the seventh sheet material is a lightweight spunbond nonwoven continuous polyester filament mat having a weight between 15 and 30 grams per square meter, such as a spunbond nonwoven polyester mat sold by Johns Manville International, Inc., under the trade designation type 488/15, type 488/20, or type 488/30. An example of a lightweight nonwoven fiberglass mat that may be used as the seventh sheet material is a lightweight nonwoven fiberglass mat having a weight between 20 and 40 grams per square meter, such as a nonwoven fiberglass mat sold by Johns Manville International, Inc., under the trade designation Dura-Glass® style 3011 mat. These mats typically have a water vapor permeance rating greater than 5 perms. The polymeric film or polymeric coating layer forms the outer layer and the outer major surface of the seventh sheet material and when combined with the spunbond nonwoven polymeric mat or fiberglass mat can provide the seventh sheet material with a water vapor permeance rating equal to or less than 1 perm. A polymeric filament web or mesh or fiberized polymeric having a lower softening point than the mat may be adhered to an inner major surface of either of these mats and used as a heat activated bonding layer to bond either of these mats to the first major surface of the insulation layer. For example a polypropylene web or open mesh having a softening point of about 250° F. or less can be adhered to the inner major surface of a spunbond nonwoven polyester mat having a softening point of about 350° F. or greater.

An eighth sheet material that may be used for the facings 12 and 22 of the faced insulation assembly 20 and for the other facings of the other faced insulation assemblies of the subject invention is a collapsed tubular sheet material that includes first and second lateral gusset portions. As shown in FIGS. 7 and 8, which show the tubular sheet material 48 prior to and after the sheet has been collapsed to form the facing, the tubular sheet material has first and second central portions 50 and 52 extending between and joining the two lateral gusset portions 54 and 56. The central portions 50 and 52 of the collapsed tubular sheet material are bonded together to form the central field portion of the facing sheet. As shown the lateral gusset portions 54 and 56 each include four layers while the central portion of the collapsed tubular sheet material includes two layers. By including an additional lateral gusset or gussets, the lateral gusset portions could each include six or more layers. The inclusion of additional layers in each of the lateral gusset portions 54 and 56 of the collapsed tubular sheet material relative to the central portion of the collapsed tubular sheet material enables the formation of lateral tabs on the facing of increased integrity and tear through resistance while using a thinner or less expensive sheet material to form collapsed tubular sheet material. The collapsed tubular sheet material 48 maybe made from transparent, translucent or pigmented polymeric films of one or more layers (e.g. cast or coextruded films) such as but not limited to LDPE films, HDPE films, PP films or combinations thereof with or without an outer mineral coating or polymeric coating layer or from kraft paper or lightweight natural kraft paper with or without an outer mineral coating or polymeric coating layer or a polymeric film layer.

As previously indicated, each of the first through eighth sheet materials discussed above for the facings of the subject invention may include a fungi growth-inhibiting agent ("a mildewcide") to inhibit the growth of fungi during storage, shipment and service and may also include a pesticide such as but not limited to an insecticide or termiticide e.g. fipronil. Preferably, each facing of the subject invention is fungi growth resistant. More preferably, each facing of the subject invention exhibits no more than traces of sporulating growth, non-sporulating growth, or both sporulating and non-sporulating growth and most preferably, no sporulating or non-sporulating growth. Where the sheet material used to form the facing is a multilayer sheet material, the fungi growth-inhibiting agent or fungi growth-inhibiting agent and pesticide may be included in any one or more or all of the layers in the sheet material, especially the outermost layer, mixed throughout the layer(s), or applied topically.

Where the sheet material includes at least one polymeric film or polymeric coating layer, the fungi growth-inhibiting agent or fungi growth-inhibiting agent and pesticide may be included in any one or more of the polymeric film or polymeric coating layers. Where the sheet material includes one or more kraft or tissue paper layers, the fungi growth inhibiting agent or fungi growth inhibiting agent and pesticide may be included in any one or more of the kraft or tissue paper layers. Where the sheet material includes one or more mineral coating, polymeric coating, or ink coating layers, the fungi growth-inhibiting agent or fungi growth-inhibiting agent and pesticide may be included in any one or more of the coating layers. Where the sheet material includes one or more nonwoven polymeric mat layers, the fungi growth-inhibiting agent or fungi growth-inhibiting agent and pesticide may be included in any one or more of the polymeric mat layers.

As alternatives to only including the fungi growth-inhibiting agent or fungi growth-inhibiting agent and pesticide in the sheet material of the facing, the fungi growth-inhibiting agent or fungi growth-inhibiting agent and pesticide could be: included only in the bonding layer bonding the central field portion of the facing to the first major surface of the insulation layer or included in both the sheet material of the facing and the bonding layer bonding the central field portion of the facing to the first major surface of the insulation layer.

An example of a fungi growth-inhibiting agent is a fungi growth resistance additive 2-(4-Thiazolyl) Benzimidazole, also known as "TBZ". Multiple forms of TBZ are available for specific applications in polymers, adhesives, coatings and additives. One example of the fungi growth resistance additive is available from Ciba Specialty Chemicals under the trade designation Irgaguard F-3000 fungi growth resistance additive. It is believed that the inclusion of the Irgaguard F-3000 fungi growth resistance additive in amounts between 0.05% and 0.5% by weight of the materials in the polymeric films, polymeric coatings, mineral coatings, ink coatings, kraft or tissue papers, and continuous polymeric filaments of the first through the eighth sheet material will effectively inhibit fungi growth. Examples of other antimicrobial, biocide fungi growth-inhibiting agents that may be used are silver zeolyte fungi growth inhibiting agents sold by Rohm & Haas Company under the trade designation KATHON fungi growth-inhibiting agent, by Angus Chemical Company under the trade designation AMICAL 48 fungi growth-inhibiting agent, and by Healthshield Technologies, LLC. under the trade designation HEALTHSHIELD fungi growth-inhibiting agent.

An example of one type of pesticide that may be used in the subject invention is a termiticide that contains fipronil as the active ingredient. This termiticide is non-repellent to termites and lethal to termites through ingestion, contact and/or transferal. Aventis Environmental Science USA of Montvale, N.J. sells such a termiticide under the trade designation "TERMIDOR". Since the termites do not smell, see or feel this termiticide, the termites continue to pass freely through the treated area picking up the termiticide and carrying the termiticide back to the colony nest. In the colony nest, other termites that contact the contaminated termites through feeding or grooming or through cannibalizing the termites killed by the termiticide become carriers of the termiticide thereby spreading the termiticide throughout the colony and exterminating the termites.

Preferably, each of the faced insulation assemblies of the subject invention has a composite flame spread and smoke developed rating equal to or less than 25/50 as measured by the ASTM E 84-01 tunnel test method, entitled "Standard Test Method for Surface Burning Characteristics of Building Materials", published July 2001, by ASTM International of West Conshohocken, Pa. Preferably, each sheet material of the subject invention and each facing of the subject invention, as bonded to the insulation layer, passes the ASTM fungi test C 1338-00, entitled "Standard Test Method for Determining Fungi Resistance of Insulation Materials and Facings", published August 2000, by ASTM International of West Conshohocken, Pa. More preferably, each sheet material of the subject invention and each facing of the subject invention, as bonded to the insulation layer, has a rating of 1 or less and most preferably 0, as rated by the ASTM fungi test G 21-96 (Reapproved 2002), entitled "Standard Practice for determining Resistance of Synthetic Polymeric Materials to Fungi", published September 1996 by ASTM International of West Conshohocken, Pa.

For certain applications, it is preferable to have the sheet material of the subject invention and the field portion of the facing of the subject invention, as bonded to the major surface of the insulation layer (e.g. major surface 26 of the insulation layer 24), exhibit a water vapor permeance rating of less than 1 grain/ft$^2$/hour/inch Hg (less than 1 perm) to provide a water vapor retarder or barrier for the faced fibrous insulation blanket, e.g. a faced resilient fiberglass insulation blanket. For other applications, it is preferable to have the sheet material of the subject invention "water vapor breathable" and the field portion of the facing of the subject invention, as bonded to the major surface of the insulation layer (e.g. major surface 26 of insulation layer 24) "water vapor breathable" and exhibit a water vapor permeance rating of more than 1 grain/ft$^2$/hour/inch Hg (more than 1 perm); more preferably, exhibit a water vapor permeance rating of about 3 or more grains/ft$^2$/hour/inch Hg (about 3 or more perms); and, more preferably, exhibit a water vapor permeance rating of about 5 or more grains/ft$^2$/hour/inch Hg (about 5 or more perms) to provide a porous facing for the faced insulation assembly that permits the passage of water vapor through the faced surface of the faced insulation assembly of the subject invention. With regard to these water vapor breathable facing materials, for certain applications, it may be desired to have facings made of these materials as applied to the insulation layer exhibit a water vapor permeance rating within a selected range e.g. a water vapor permeance rating between 1 perm and 25 perms, a water vapor permeance rating between 5 perms and 25 perms or a water vapor permeance rating between 5 perms and 100 perms. For sheet materials such as the first through the fifth, the seventh and the eighth sheet materials that normally have a water vapor permeance rating equal to or less than one perm, the sheet material forming the central field portion of the facing (field portion 32 in the facing 22) can be selectively modified (e.g. perforated) to increase the water vapor permeance rating to a desired level. If the sheet materials are perforated, the perforations may be either microscopic-perforations or macroscopic-perforations with the number and the size of the perforations per unit area of the central field portion of the facing being selected to achieve the desired water vapor permeance rating for the facing. In addition, certain polymeric films may have a sufficiently high permeability rating that these films are considered "water vapor breathable" and for certain applications these films may not have to be perforated or otherwise modified to increase their water vapor permeance ratings. Examples of such polymeric films are polymeric films available from Clopay® Plastic Products, under the trade designation Clopay® Comfort Films. These films are monolithic, microporous or apertured films that permit the passage of water vapor through the films. When the facings of the subject invention are applied to the major surface of the insulation layer, the bonding layer bonding the central field portion of the facing to the first or second major surface of the insulation layer can be applied to have no appreciable affect on the permeance rating of the facing as applied to the insulation layer or to appreciably affect and alter the permeance rating of the facing as applied to the insulation layer so that the facing as applied to the insulation layer provides the faced building insulation assembly with the desired water vapor permeance rating. For example, the bonding layer applied to the central field portion of the facing could be formed in: a series of spaced apart longitudinally extending adhesive strips of selected width(s) and spacing(s), a series of spaced apart transversely extending adhesive strips of selected width(s) and spacing(s), a uniform or random pattern of adhesive dots of selected size(s) and spacing(s), a continuous adhesive layer of a selected uniform thickness or selected varying thicknesses, or some combination of the above, to achieve with the water vapor permeance rating of the central field portion of the facing a selected water vapor permeance rating for the central field portion of the facing as applied to the first major surface of the insulation layer. With the sixth sheet material, which may have a water vapor permeance rating of 25, 50, 100 or greater, or any sheet material that may have a higher water vapor permeance rating than desired for a particular application, the bonding layer could be used to reduce the water vapor permeance rating of the central field portion of the facing without the use of an outer coating on the sheet material.

As discussed above, various bonding agents may be used to bond the sheet material forming the central field portion of the facings of the subject invention to the major surface of the insulation layer, such as but not limited to amorphous polypropylene, and these bonding agents may be applied by different methods. For example, as the faced insulation assembly is being manufactured, the bonding agent could be applied to the inner major surface of the facing immediately prior to applying the facing to the insulation layer by: printing the bonding agent on the inner major surface of the facing, applying the bonding agent to the inner major surface of the facing using a particulate or fiberized hot melt spray or water based spray, or by applying a water based or other bonding agent to the inner major surface of the facing by roll coating. Alternatively, the bonding agent, e.g. a heat activated bonding agent, can be preapplied to the inner major surface of the facing when the facing is manufactured and rolled into long rolls and the bonding agent can be activated when the rolls of facing are unwound and adhered to the major surface of the insulation layer.

FIGS. 9 to 21 show additional embodiments of the faced insulation assembly of the subject invention. The elements of the faced insulation assemblies of FIGS. 9 to 21 that correspond to those of FIGS. 1 to 3 will have corresponding reference numerals in the hundreds with the same last two digits as the reference numerals used for those elements in FIGS. 1 to 3. Unless otherwise stated the elements of FIGS. 9 to 21 identified with reference numerals having the same last two digits as the reference numerals referring to those elements in FIGS. 1 to 3 are and function the same as those of FIGS. 1-3.

FIG. 9 shows a partial cross section of a faced insulation assembly 120 of the subject invention with a facing sheet 122 that has Z-folded tabs 158 (only one of which is shown) and FIG. 10 shows a partial cross section of a faced insulation assembly 220 with of the subject invention that has C-folded tabs 260 (only one of which is shown) that can be unfolded and extended beyond the lateral surface of the insulation layer 124 or 224 for attachment to and/or to overlay framing members. The Z-folded tabs 158 and C-folded tabs 260 are substituted for the tabs 34, are typically between about 0.5 and about 2.0 inches in width, and typically can be extended beyond the lateral surfaces of the insulation layers 124 and 224 between about 0.25 and about 1.5 inches. Like the central field portion 32 and lateral tabs 34 of facing 22, the central field portion 132 and lateral tabs 158 of facing 122 and the central field portion 232 the lateral tabs 260 of the facing 222 are made from the same piece of sheet material.

FIGS. 11 and 12 show partial cross sections of additional embodiments 320 and 420 of the faced insulation assembly of the subject invention. In the facings 322 and 422 of the embodiments 320 and 420, lateral tabs 364 and 466 are substituted for the lateral tabs 34 of facing 22. The tabs 364 and 466 are made of materials that differ from the material used to form the central field portions 332 and 432 of the facings 322 and 422; are bonded by adhesive layers 368 and 470, by ultra sonic welding or by other bonding means to the upper surface of lateral edge portions of the central field portion 332 and 432 of the facings 322 and 422; and are typically between about 0.5 and about 2.0 inches in width. The tab 364 of the faced insulation assembly 320 is like the tab 34 of the faced insulation assembly 20. The tab 466 of the faced insulation assembly 420 of FIG. 12 is a Z-folded tab. The tabs 364 and 466 can be unfolded and extended beyond the lateral surfaces of the insulation layers 324 and 424 (typically extended between 0.25 and 1.5 inches beyond the lateral surfaces of the insulation layers) for attachment to or to overlay framing members. By way of example, the materials used to form the central field portions 332 and 432 of the facings 322 and 422 and the lateral tabs 364 and 466 of the facings 332 and 432 may differ in thickness (e.g. a 1.0 mil thick films form the central field portions 332 and 432 of the facings while a 1.5 mil thick films form the tabs 364 and 466) and/or in composition (e.g. the central field portions 332 and 432 of the facings may be made from polypropylene films while the tabs 364 and 466 are formed from polyester films). The central field portions 332 and 432 of the facings may be made of single layers while the tabs 364 and 466 are each a laminate of multiple layers for greater integrity. The central field portions 332 and 432 of the facings may be made of laminates containing a certain number of layers while the tabs 364 and 466 are made of laminates containing a different number of layers and typically more layers for increased tab integrity. The layers of the laminates may include both layers of sheet materials (e.g. film, mat, or paper materials) and coating materials. The central field portions of the facings each may have one or more layers of a film, a coated film, paper, a coated paper, a fiberglass or spunbond polymeric filament or fiber mat, or a coated fiberglass or spunbond polymeric filament or fiber mat while the tabs are made of an open spunbond polymeric filament or fiber mat or an open mesh that is sufficiently open to permit adhesive to pass through the tabs to bond wallboard directly to framing members through the tabs.

FIG. 13 shows an embodiment 520 of the faced insulation assembly of the subject invention wherein both the facing 522 and the insulation layer 524 are longitudinally separable to form faced insulation sections 572 having lesser widths than the faced insulation assembly 520. The insulation layer 524 has one or more longitudinally extending series of cuts and separable connectors, schematically represented by lines 574, which enable the insulation layer 524 to be pulled apart or separated by hand into the insulation sections 572 of lesser widths than the insulation layer 524. For each such series of cuts and separable connectors 574 in the insulation layer 524, the field portion 532 of the sheet 530 forming the facing 522 has a line of weakness 576 therein that is longitudinally aligned with the series of cuts and separable connectors so that the facing can also be separated or pulled apart by hand at each series of cuts and separable connectors. The line of weakness 576 may be formed as a perforated line, as an etched score line that reduces the thickness of the sheet material along the line, or the line may be otherwise weakened to facilitate the separation of the facing sheet by hand along the line 576. Other than the one or more series of cuts and separable connectors 574 in the insulation layer 524 and the one or more lines of weakness 576 in the facing 522, the faced insulation assembly 520 of FIG. 13 is the same as the faced insulation assembly 20.

FIGS. 14 and 15 show an embodiment 620 of the faced insulation assembly of the subject invention wherein both the facing 622 and the insulation layer 624 are longitudinally separable to form faced insulation sections 678 having lesser widths than the faced insulation assembly 624. The insulation layer 624 has one or more longitudinally extending series of cuts and separable connectors, schematically represented by lines 680, which enable the insulation layer 624 to be pulled apart or separated by hand into the insulation sections 678 of lesser widths than the insulation layer 624. For each such series of cuts and separable connectors 678 in the insulation layer 624, the field portion 632 of the sheet 630 forming the facing 622 has a fold 682 therein that is longitudinally aligned with the series of cuts and separable connectors. A separable pressure sensitive or other separable bonding adhesive 684 separably bonds the two segments of each fold 682 to each other and, typically, the fold line 686 joining the segments of each fold 682 will be perforated, scored, or otherwise weakened to permit the fold to be pulled apart or separated by hand at the fold line 686 to form tab segments. Preferably, each segment of each fold 682 is between about 0.25 and about 1.0 inches in width. Other than the one or more series of cuts and separable connectors 680 in the insulation layer 624 and the one or more folds 682 in the facing 622 with weakened fold lines 686, the faced insulation assembly 620 of FIGS. 14 and 15 is the same as the faced insulation assembly 20.

FIGS. 16, 17 and 18 show a faced insulation assembly 720 of the subject invention that is faced with a facing 722 of the subject invention without preformed tabs. The faced insulation assembly 720 of FIGS. 16, 17 and 18 includes the facing 722 and an insulation layer 724. The insulation layer 724 is made of a resilient insulation material, such as but not limited to a fiberglass insulation, that can be compressed in the direction of its width, e.g. laterally compressed an inch or more, and, after the compressive forces are released, will recover or substantially recover to its initial width. The insulation layer 724 has first and second major surfaces 726 and 728, which are defined by the length and width of the insulation layer, and a thickness. The facing 722 of the faced insulation assembly 720 is formed by a sheet material that has a central field portion 732, that is substantially coextensive with the first major surface of the insulation layer 724, but has no preformed tabs. The central field portion 732 of the facing 722 has a first outer major surface and a second inner major surface. The central field portion 732 of the facing 722 overlays and is bonded, typically by a bonding layer 736 on the inner major surface of central field portion 732 of the facing, to the major surface 726 of the insulation layer 724. When the insulation layer 724 is compressed in the direction of its width to fit between a pair of framing members that are spaced a distance less than the width of the faced insulation assembly 720, the lateral edge portions 788 of the sheet 730 separate or can be separated from the major surface 726 of the insulation layer and extended beyond the lateral surfaces of the laterally compressed insulation layer 724 (between 0.25 and about 1.5 inches) to provide a vapor retarding barrier between the facing and the framing members and/or for attachment to the framing members. As best shown in FIG. 17, in a preferred form of this embodiment the bonding layer 736 bonding the central field portion 732 of the facing to the first major surface 726 of the insulation layer 724 does not extend to the lateral edges of either the insulation layer 724 or the facing 722 so that the lateral edge portions 788 of the facing 722 are not directly bonded to the major surface 726 of the insulation layer. This facilitates the separation of the lateral edge portions 788 of the facing 722 from the insulation layer 724 when the insulation layer is compressed laterally so that the lateral edge portions 788 of the facing 722 can extend beyond the lateral surfaces of the laterally compressed insulation layer 724 to form lateral tabs. However, as shown in FIG. 18, the bonding layer 736 bonding the central field portion 732 of the facing 722 to the first major surface 726 of the insulation layer 724 may extend to the lateral edges of the insulation layer 724 and the facing 722 so that the bond between the lateral edge portions 788 of the facing 722 and the major surface 726 of the insulation layer must be broken before the lateral edge portions 788 of the facing 722 can be separated from the major surface 726 of the insulation layer 724 and extended to form the lateral tabs.

FIGS. 19, 20 and 21 show an embodiment 820 of the faced insulation assembly of the subject invention wherein both the facing 822 and the insulation layer 824 are longitudinally separable to form faced insulation sections 890 having lesser widths than the faced insulation assembly 820. Like the faced insulation assembly 720 of FIGS. 16, 17 and 18, the facing of faced insulation assembly 820 does not have preformed tabs and the insulation layer 824 is made of a resilient insulation material, such as but not limited to a fiberglass insulation, that can be compressed in the direction of its width, e.g. laterally compressed an inch or more, and, after the compressive forces are released, will recover or substantially recover to its initial width. The insulation layer 824 has one or more longitudinally extending series of cuts and separable connectors, schematically represented by lines 892, which enable the insulation layer 824 to be pulled apart or separated by hand into the insulation sections 890 of lesser widths than the insulation layer 824. For each such series of cuts and separable connectors 892 in the insulation layer 824, the field portion 832 of the sheet 830 forming the facing 822 has a line of weakness 894 therein that is longitudinally aligned with the series of cuts and separable connectors and can be pulled apart or separated by hand. The line of weakness 894 may be formed as a perforated line, as an etched score line that reduces the thickness of the sheet material along the line, or the line may be otherwise weakened to facilitate the separation of the facing sheet along the line 894.

Preferably, as shown in FIG. 19, the bonding layer 836 bonding the central field portion 832 of the facing sheet to the first major surface 826 of the insulation layer 824 does not extend to the lateral edges of either the insulation layer 824 or the facing 822 so that the lateral edge portions 896 of the facing sheet are not directly bonded to the major surface 826 of the insulation layer. Preferably, the bonding layer 836 will end from about 0.25 to about 1.5 inch from the lateral edges of the facing sheet 822 and the insulation layer 824 so that the width of the unbonded lateral edge portions 896 is between about 0.25 and about 1.5 inches. Preferably, as shown in FIGS. 19 and 20, the bonding layer bonding the central field portion 832 of the facing sheet to the first major surface 826 of the insulation layer 824 is also omitted from portions 898 of the facing located adjacent each series of cuts and separable connectors 892 in the insulation layer 824 so that the facing is not directly bonded to the insulation layer along each series of cuts and separable connectors 892. Preferably, the bonding layer 836 will be omitted for a spacing of about 0.25 to about 1.5 inches from each side of each series of cuts and separable connectors in the insulation layer 824 and the lines 894 of weakness in the facing sheet 822 so that the widths of the unbonded facing portions 898 are between about 0.25 and about 1.5 inches. The omission of bonding agent from adjacent the lateral edges of the faced insulation assembly 820 facilitates the separation of the lateral edge portions 896 of the facing sheet from the insulation layer 824 so that the lateral edge portions 896 of the facing 822 can be extended as tabs beyond the lateral surfaces of the laterally compressed insulation layer 824 or extended as tabs beyond the lateral surfaces of compressed insulation sections 890 that have been separated from the insulation layer 824. The omission of bonding agent from adjacent the cuts and separable connectors 892 facilitates the separation of the portions 898 of the facing sheet from the insulation layer 824 adjacent each series of cuts and separable connectors 892 so that the portions 898 of the facing sheet can be extended as tabs beyond the lateral surfaces of the laterally compressed insulation sections 890. However, the bonding layer 836 bonding the central field portion 832 of the facing to the first major surface 826 of the insulation layer 824 may extend to the lateral edges of the insulation layer 824 and the facing sheet (e.g. as shown in FIG. 18) so that the lateral edge portions 896 of the facing sheet must be separated from the major surface 826 of the insulation layer 824 to form the lateral tabs and, as shown in FIG. 21, the facing may be directly bonded to the major surface 826 of insulation layer 824 adjacent each series of cuts and separable connectors 892 so that the portions 898 of the facing sheet must be separated from the major surface 826 of the insulation layer 824 to form tabs.

When the insulation layer 824 of faced insulation assembly 820 is compressed in the direction of its width to fit between a pair of framing members that are spaced a distance less than the width of insulation layer 824, the lateral edge portions 896 of the facing sheet separate or can be separated from the major surface 826 of the insulation layer and extended as tabs beyond the lateral surfaces of the laterally compressed insulation layer 824 to provide a vapor retarding barrier between the facing and the framing members and/or for attachment to the framing members. When an insulation section 890 of faced insulation assembly 820 is compressed in the direction of its width to fit between a pair of framing members that are spaced a distance less than the width of insulation section 890, the portions of the facing sheet adjacent the lateral surfaces of the compressed insulation section 890 (portions 896 and/or 898) separate or can be separated from the major surface 826 of the insulation layer and extended as tabs beyond the lateral surfaces of the laterally compressed insulation section 890 to provide a vapor retarding barrier between the facing and the framing members and/or for attachment to the framing members.

In describing the invention, certain embodiments have been used to illustrate the invention and the practices thereof. However, the invention is not limited to these specific embodiments as other embodiments and modifications within the spirit of the invention will readily occur to those skilled in the art on reading this specification. Thus, the invention is not intended to be limited to the specific embodiments disclosed, but is to be limited only by the claims appended hereto.

What is claimed is:

1. A faced building insulation assembly for insulating a building wall, ceiling, floor, or roof cavity, comprising:
    a resilient fibrous insulation layer having a density of about 1.6 pounds/ft$^3$ or less; the insulation layer having a length, a width and a thickness; the insulation layer having first and second major surfaces defined by the length end width of the insulation layer;
    a first facing sheet having a central field portion overlaying and substantially coextensive with the first major surface of the insulation layer and forming a first major surface of the building insulation assembly for location on a normally cooler and less humid side of a building wall, ceiling, floor, or roof cavity being insulated with the building insulation assembly; the central field portion of the first facing sheet being bonded to the first major surface of the insulation layer, the central field portion of the first facing sheet, as bonded to the first major surface of the insulation layer, having a water vapor permeance rating of about 5 perms or greater so that the first major surface of the faced building insulation assembly formed by the central field portion of the first lacing sheet has a water vapor permeance rating of about 5 perms or greater to permit the passage of water vapor through the first major surface of the building insulation assembly; and
    a second facing sheet having a central field portion overlaying and substantially coextensive with the second major surface of the insulation layer and forming a second major surface of the building insulation assembly for location on a normally hotter and more humid side of a building wall, ceiling, floor, or roof cavity being insulated with the building insulation assembly; the central field portion of the second facing sheet being bonded to the second major surface of the insulation layer, the central field portion of the second facing sheet, as bonded to the second major surface of the insulation layer, having a water vapor permeance rating of 1 perm or less so that the second major surface of the faced building insulation assembly has a water vapor permeance rating of 1 perm or less to retard the passage of water vapor through the second major surface of the building insulation assembly.

2. The faced building insulation assembly according to claim 1, wherein:
    the width of the resilient fibrous insulation layer is from about 15 inches to about 15½ inches to be equal to or somewhat greater in width than a standard cavity width of a cavity to be insulated with the faced building insulation assembly; and the length of the insulation layer is about 46 inches or greater.

3. The faced building insulation assembly according to claim 2, wherein:
    the first facing sheet has first and second lateral tabs extending for the length of the first facing sheet that are separated from each other by the central field portion of the first facing sheet.

4. The faced building insulation assembly according to claim 1, wherein:
    the width of the resilient fibrous insulation layer is from about 23 inches to about 23½ inches to be equal to or somewhat greater in width than a standard cavity width of a cavity to be insulated with the faced building insulation assembly; and the length of the insulation layer is about 46 inches or greater.

5. The faced building insulation assembly according to claim 4, wherein:

the first facing sheet has first and second lateral tabs extending for the length of the first facing sheet that are separated from each other by the central field portion of the first facing sheet.

* * * * *